US012400494B2

(12) United States Patent
Toyoda et al.

(10) Patent No.: US 12,400,494 B2
(45) Date of Patent: Aug. 26, 2025

(54) VEHICLE OPERATION MANAGEMENT SYSTEM THAT GENERATES VEHICLE OPERATION CHANGE INFORMATION WHEN TEMPERATURE TOLERANCE IS WITHIN TOLERANCE RANGE, VEHICLE OPERATION MANAGEMENT PROGRAM, AND VEHICLE OPERATION MANAGEMENT METHOD

(71) Applicant: BRIDGESTONE CORPORATION, Tokyo (JP)

(72) Inventors: Kenji Toyoda, Tokyo (JP); Kosuke Akiba, Tokyo (JP); Shunsuke Hiratsuka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 218 days.

(21) Appl. No.: 18/267,677

(22) PCT Filed: Dec. 9, 2021

(86) PCT No.: PCT/JP2021/045327
§ 371 (c)(1),
(2) Date: Jun. 15, 2023

(87) PCT Pub. No.: WO2022/131124
PCT Pub. Date: Jun. 23, 2022

(65) Prior Publication Data
US 2024/0062594 A1    Feb. 22, 2024

(30) Foreign Application Priority Data
Dec. 18, 2020    (JP) ................. 2020-210082

(51) Int. Cl.
*G07C 5/08*    (2006.01)
*G07C 5/04*    (2006.01)

(52) U.S. Cl.
CPC ............ *G07C 5/0808* (2013.01); *G07C 5/04* (2013.01)

(58) Field of Classification Search
CPC ................. G07C 5/0808; G07C 5/04
See application file for complete search history.

(56) References Cited

U.S. PATENT DOCUMENTS 9,079,461 B2   7/2015  Suh et al.
10,533,866 B2  1/2020  Van Latum et al.
(Continued)

FOREIGN PATENT DOCUMENTS

JP    2007-091202 A    4/2007
JP    2007-210527 A    8/2007
(Continued)

OTHER PUBLICATIONS

International Search Report for PCT/JP2021/045327 dated Feb. 22, 2022.

*Primary Examiner* — James J Lee
*Assistant Examiner* — Steven Vu Nguyen
(74) *Attorney, Agent, or Firm* — Sughrue Mion, PLLC

(57) ABSTRACT

Provided with a tire temperature prediction unit configured to calculate a predicted tire temperature at a specific time point based on a history of operation information of a vehicle mounted with tires; a temperature tolerance calculation unit configured to calculate a temperature tolerance at the specific time point; a determination unit configured to determine whether or not the temperature tolerance is within a preset tolerance range; an information generation unit configured to generate vehicle operation change information which changes operation of the vehicle when the determination unit determines that the temperature tolerance is within the tolerance range; and a communication unit configured to transmit the generated vehicle operation change (Continued)

information to the vehicle or to an external system which manages the operation of the vehicle.

12 Claims, 5 Drawing Sheets

(56) References Cited

U.S. PATENT DOCUMENTS

| | | | |
|---|---|---|---|
| 2007/0057478 A1* | 3/2007 | Shoyama | B60C 23/0408 |
| | | | 280/86.5 |
| 2018/0222488 A1 | 8/2018 | Wood et al. | |
| 2022/0055422 A1* | 2/2022 | Birdsall | B60C 23/0479 |
| 2022/0080786 A1* | 3/2022 | Iizuka | B60C 23/0474 |

FOREIGN PATENT DOCUMENTS

| | | |
|---|---|---|
| JP | 2007-210528 A | 8/2007 |
| JP | 2018-086892 A | 6/2018 |
| WO | 2020/205703 A1 | 10/2020 |

* cited by examiner

VEHICLE OPERATION MANAGEMENT SYSTEM THAT GENERATES VEHICLE OPERATION CHANGE INFORMATION WHEN TEMPERATURE TOLERANCE IS WITHIN TOLERANCE RANGE, VEHICLE OPERATION MANAGEMENT PROGRAM, AND VEHICLE OPERATION MANAGEMENT METHOD

CROSS REFERENCE TO RELATED APPLICATIONS

This application is a National Stage of International Application No. PCT/JP2021/045327 filed Dec. 9, 2021, claiming priority based on Japanese Patent Application No. 2020-210082 filed Dec. 18, 2020.

TECHNICAL FIELD

The present invention relates to a vehicle operation management system, a vehicle operation management program and a vehicle operation management method applicable to vehicles such as dump trucks used in a mine.

BACKGROUND ART

Conventionally, sensor modules are installed in the tires of a dump truck used in a mine to measure the internal pressure and temperature of the tires. A technique for managing the tires based on the measured internal pressure and temperature of the tires has been proposed (Patent Literature 1).

More specifically, for example, when the measured values of the internal pressure and temperature of the tires are not within a tolerance range, deterioration suppression information is transmitted to the vehicle from which the measured values have been transmitted, in order to suppress the progress of deterioration of the tires.

The deterioration suppression information includes information on an inspection, a reduction in load capacity, a decrease in vehicle speed, an adjustment of tire inner pressure, and a change of travel route.

CITATION LIST

Patent Literature

Patent Literature 1: JP Unexamined Patent Application Publication No. 2007-91202

SUMMARY OF THE INVENTION

Incidentally, it is known that a tire temperature increases as conditions such as speed or load become more severe due to operation of the vehicle.

As the tire temperature increases, there is a correlation that the failure probability of the tires also increases.

Accordingly, there has been proposed a technique that controls the operation of tires by performing real-time monitoring of the temperature using a tire pressure monitoring system (TPMS) to suppress the temperature of the tires from becoming excessively high.

It is known that a time delay occurs when the temperature of the tires changes. In particular, for tires of large sizes, such as those represented by very large mining tires, a time delay from a temperature change of the tires can reach the order of several hours.

Accordingly, there has been a problem that it is difficult to grasp the final temperature that the tires will reach only by real-time monitoring.

In addition, even using the above technique, there has been a problem that it is difficult to make full use of the durability of the tires, which increases the operation cost.

The present invention has been made in view of the above problems, and an object of the present invention is to provide a vehicle operation management system, a vehicle operation management program and a vehicle operation management method which are capable of improving productivity by reducing failures of tires or the like, and reducing the operation cost by making full use of the durability of tires.

A vehicle operation management system according to an aspect of the present invention includes: a tire temperature prediction unit configured to calculate a predicted tire temperature at a specific time point based on a history of operation information of a vehicle mounted with tires; a temperature tolerance calculation unit configured to calculate a temperature tolerance at the specific time point by comparing a preset temperature threshold with the predicted tire temperature; a determination unit configured to determine whether or not the temperature tolerance is within a preset tolerance range; an information generation unit configured to generate vehicle operation change information which changes operation of the vehicle when the determination unit determines that the temperature tolerance is within the tolerance range; and a communication unit configured to transmit the generated vehicle operation change information to the vehicle or to an external system which manages the operation of the vehicle.

This configuration makes it possible to extend tire life and reduce failures of the tires. In addition, it is possible to improve the productivity of the vehicle.

Further, the vehicle operation change information may include information for improving productivity of the vehicle.

This makes it possible to further improve the productivity of the vehicle.

Further, the operation information may include future operation information or virtual operation information about the vehicle, and the specific time point may be a time point after a predetermined time has elapsed from a time point at which a prediction is made.

This makes it possible to make temperature predictions based on actual operations.

Further, the tire temperature prediction unit and the temperature tolerance calculation unit may be provided in each of a plurality of vehicles, each of the temperature tolerance calculation units may calculate a temperature tolerance for each tire of the respective vehicles, and the information generation unit may generate the vehicle operation change information based on a determination result of the determination unit about a temperature tolerance of the tires of the respective vehicles.

This makes it possible to transmit the vehicle operation change information based on the conditions of each tire of the plurality of vehicles.

Further, the vehicle operation management system may further include a conversion unit configured to convert a temperature tolerance to at least one of a speed tolerance and a load tolerance of a vehicle, and the information generation unit may generate the vehicle operation change information related to the speed tolerance and the load tolerance.

This makes it possible to transmit the vehicle operation change information based on the speed tolerance and the load tolerance of the vehicle.

Further, the conversion unit may perform conversion processing so as not to exceed a preset upper limit for load or speed for each road surface on which the vehicles travel.

This enables conversion based on each road surface on which the vehicle travels.

Further, the conversion unit may perform conversion processing so as not to exceed a preset upper limit for load or speed for each type of the vehicle.

This enables conversion based on each type of the vehicle.

Further, when the determination unit determines that the temperature tolerance is out of a tolerance range, the information generation unit may generate deterioration suppression information capable of suppressing progress of deterioration of the tires of the vehicle.

This makes it possible to suppress the progress of deterioration of the tires of the vehicle.

Further, a vehicle operation management program according to another aspect of the present invention, which is executed by a vehicle operation management system, includes: a tire temperature prediction step of calculating a predicted tire temperature at a specific time point based on a history of operation information of a vehicle mounted with tires; a temperature tolerance calculation step of calculating a temperature tolerance at the specific time point by comparing a preset temperature threshold with the predicted tire temperature; a determination step of determining whether or not the temperature tolerance is within a preset tolerance range; an information generation step of generating vehicle operation change information which changes operation of the vehicle when determining that the temperature tolerance is within the tolerance range; and a transmission step of transmitting the generated vehicle operation change information to the vehicle or to an external system which manages the operation of the vehicle.

This configuration makes it possible to extend tire life and reduce failures of the tires. In addition, it is possible to improve the productivity of the vehicle.

A vehicle operation management method according to another aspect of the present invention includes: a tire temperature prediction process of calculating a predicted tire temperature at a specific time point based on a history of operation information of a vehicle mounted with tires; a temperature tolerance calculation process of calculating a temperature tolerance at the specific time point by comparing a preset temperature threshold with the predicted tire temperature; a determination process of determining whether or not the temperature tolerance is within a preset tolerance range; an information generation process of generating vehicle operation change information which changes operation of the vehicle when determining that the temperature tolerance is within the tolerance range; and a transmission process of transmitting the generated vehicle operation change information to the vehicle or to an external system which manages the operation of the vehicle.

This configuration makes it possible to extend tire life and reduce failures of the tires. In addition, it is possible to improve the productivity of the vehicle.

The present embodiment makes it possible to provide a vehicle operation management system, a vehicle operation management program and a vehicle operation management method which are capable of improving productivity by reducing failures of tires or the like, and reducing the operation cost by making full use of the durability of tires.

DESCRIPTION OF EMBODIMENTS

Figure 1:
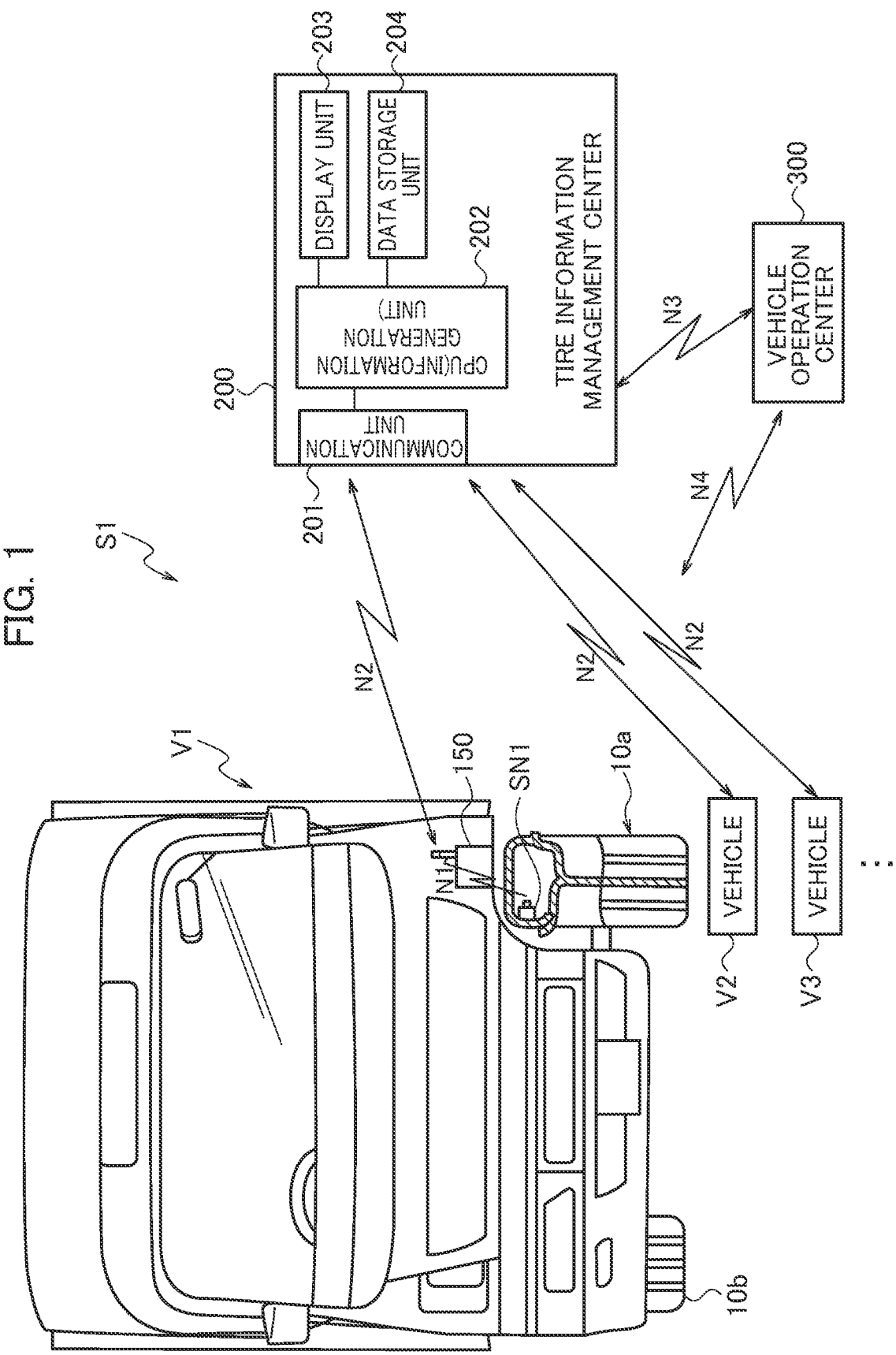
FIG. 1 is a schematic configuration diagram illustrating a schematic configuration of a vehicle operation management system according to an embodiment.

A vehicle operation management system S1 according to an embodiment of the present invention will be described with reference to FIGS. 1 and 2.

Note that the same or similar portions are denoted by the same or similar reference numerals in the following descriptions of the drawings. It should be noted however that the drawings are schematic and ratios of dimensions and the like are different from the actual ones.

Accordingly, specific dimensions and the like should be determined in consideration of the following descriptions. Moreover, the drawings include parts showing dimensional relations and ratios that are different from each other, as a matter of course.

(Schematic Configuration of Vehicle Operation Management System)

A schematic configuration of a vehicle operation management system S1 according to an embodiment will be described with reference to a schematic configuration diagram of FIG. 1.

The vehicle operation management system S1 includes a plurality of vehicles V1 (V2, V3 . . . ), a tire information management center 200 that manages information about tires (10a, 10b . . . ) of the respective vehicles V1 (V2, V3 . . . ), and a vehicle operation center 300 that manages the operation of the vehicles V1 (V2, V3 . . . ).

The vehicles V1 (V2, V3 . . . ) may be, for example, mine dump trucks that transport various mineral resources to a predetermined destination at a mining site 600 (see FIG. 3, etc.), although these are not particularly limited thereto.

Figure 3:
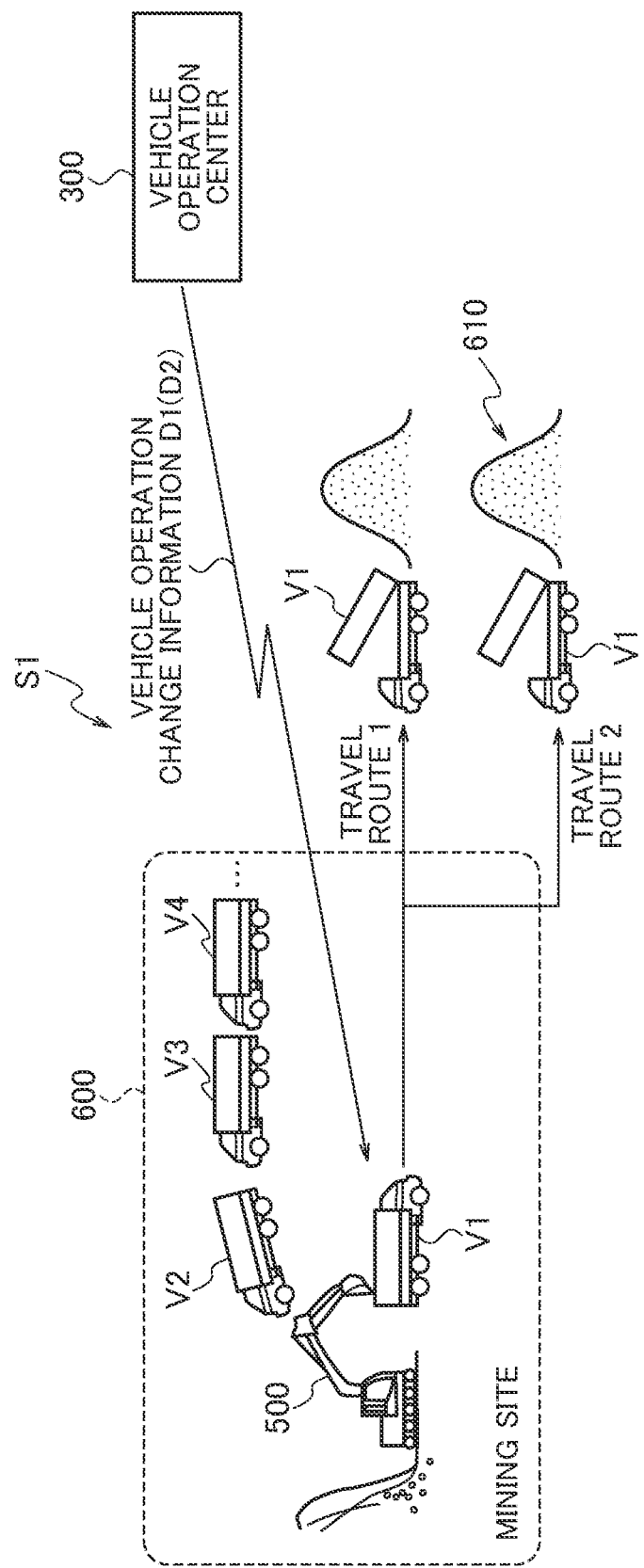
FIG. 3 is an explanatory diagram illustrating an operation example of vehicles (part 1).

As illustrated in FIG. 3 or the like which will be described later, the loading platform of the vehicles V1 (V2, V3 . . . ) is loaded with mineral resources with a predetermined load by an excavator 500.

The vehicles V1 (V2, V3 . . . ) loaded with mineral resources are operated by being separated into a plurality of travel routes 1, 2, or the like, with different road surface conditions, incline conditions, travel distances, or the like.

Each of the vehicles V1 (V2, V3 . . . ) includes: a sensor module SN1 installed in each tire 10 (10a, 10b . . . ) to acquire temperature information, internal pressure information, or the like; and an on-board device 150 to acquire temperature information, internal pressure information, or the like from the sensor module SN1 via a wireless line N1 and perform various processing.

The detailed configuration of the on-board device 150 will be described later.

The tire information management center 200 includes: a communication unit 201 that transmits and receives various information to/from the on-board device 150 via a wireless line N2; a CPU 250 configured of an information generation unit 202 or the like which will be described later; a display unit 203 configured of a monitor or the like that displays various information; and a data storage unit 204 configured of a hard disk or the like that stores various information.

The vehicle operation center 300 is configured to receive the vehicle operation change information generated by the tire information management center 200 via a wireless line N3 and to transmit the vehicle operation change information to each vehicle V1 (V2, V3 . . . ) via a wireless line N4 at a predetermined timing.

(Functional Configuration of Vehicle Operation Management System)

Figure 2:
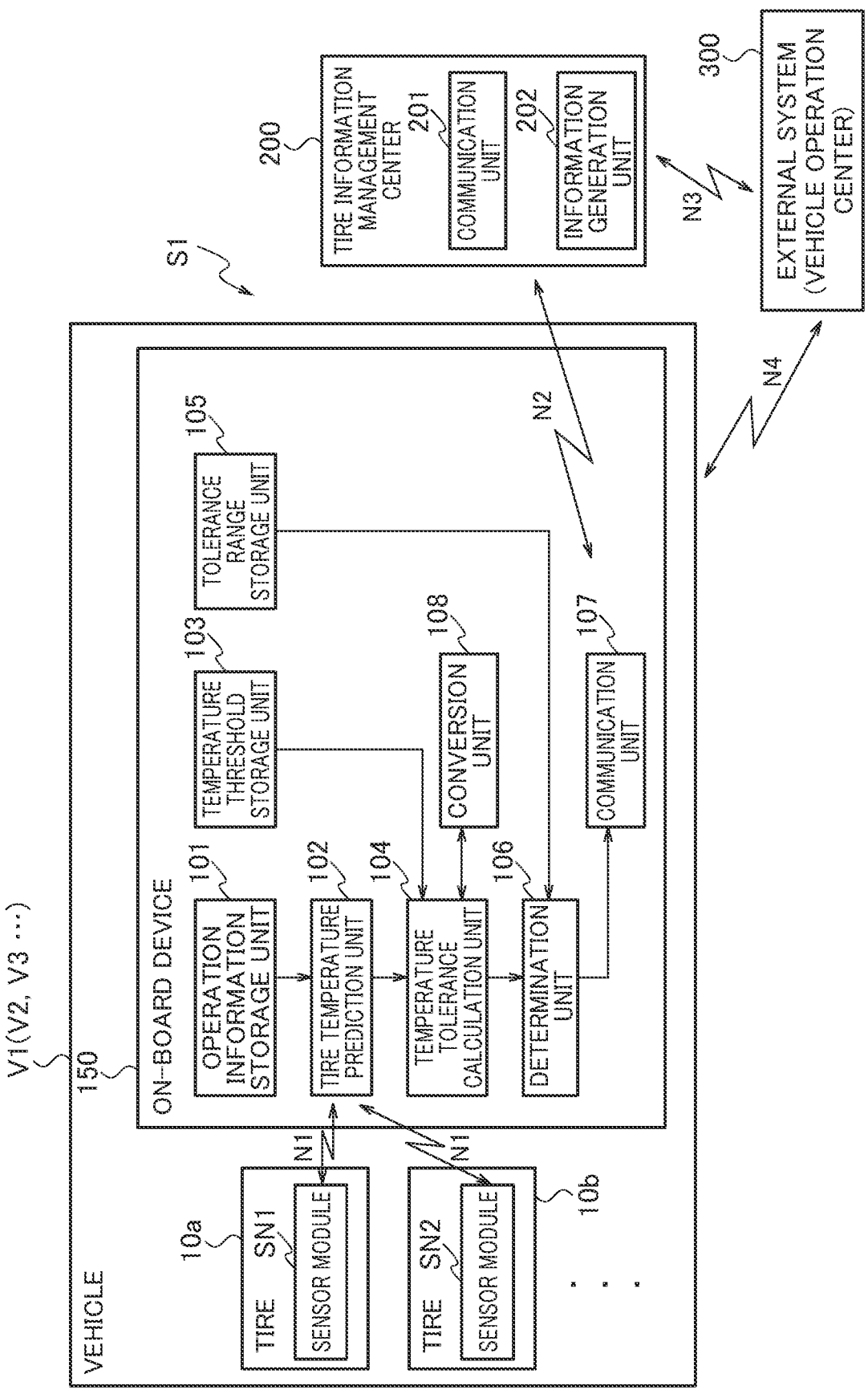
FIG. 2 is a functional block diagram illustrating a functional configuration of the vehicle operation management system according to the embodiment.

As illustrated in the functional block diagram of FIG. 2, the on-board device 150 includes an operation information storage unit 101 configured of a flash memory or the like that stores operation information of the vehicle V1 or the like.

In addition, the on-board device 150 includes a tire temperature prediction unit 102 configured of a CPU or the like that calculates a predicted tire temperature at a specific time point based on the history of the stored operation information.

In addition, the on-board device 150 includes a temperature tolerance calculation unit 104 configured of a CPU or the like that calculates a temperature tolerance at a specific time point by comparing a preset temperature threshold with a predicted tire temperature. The preset temperature threshold is stored in a temperature threshold storage unit 103 configured of a flash memory or the like.

In addition, the on-board device 150 includes a determination unit 106 configured of a CPU or the like that determines whether or not the temperature tolerance is within a preset tolerance range. The data of the tolerance range is stored in a tolerance range storage unit 105 configured of a flash memory or the like.

In addition, the on-board device 150 includes a communication unit 107 that transmits the determination result of the determination unit 106 to the tire information management center 200 via the wireless line N2.

The tire information management center 200 receives data such as the determination result of the determination unit 106 from the communication unit 201.

In addition, the tire information management center 200 includes an information generation unit 202 configured of the CPU 250 or the like that generates the vehicle operation change information for changing the operation of the vehicle V1 or the like when the determination unit 106 determines as the determination result that the temperature tolerance is within a tolerance range.

The communication unit 201 transmits the vehicle operation change information generated by the information generation unit 202 to the vehicle operation center 300 serving as an external system via the wireless line N3. In addition, the vehicle operation center 300 transmits the vehicle operation change information to the vehicle V1 or the like at a predetermined timing via the wireless line N4.

The vehicle operation change information may include information for improving the productivity of the vehicle V1 or the like.

The operation information may also include future operation information or virtual operation information about the vehicles. Further, a specific time point may be a point after a predetermined time has elapsed from the point at which a prediction is made.

The on-board device 150 including the tire temperature prediction unit 102, the temperature tolerance calculation unit 104 and the like is installed in each of the vehicles V1, V2, V3 . . . .

The respective temperature tolerance calculation units 104 calculate a temperature tolerance for each of the tires (10a, 10b . . . ) of the respective vehicles V1, V2, V3 . . . .

In addition, the information generation unit 202 of the tire information management center 200 generates the vehicle operation change information based on the determination result of the determination unit 106 about the temperature tolerance of the tires of the respective vehicles V1, V2, V3 . . . .

The generated vehicle operation change information is transmitted to the respective vehicles V1, V2, V3 . . . or to the vehicle operation center 300, and an operation change of the respective vehicles V1, V2, V3 . . . is performed based on the vehicle operation change information (for example, an increase or a decrease in speed, a change of travel route, etc.).

The on-board device 150 may further include a conversion unit 108 that converts a temperature tolerance to at least one of the speed tolerance and the load tolerance of the vehicles V1, V2, V3 . . . .

In this case, the information generation unit 202 generates the vehicle operation change information related to the speed tolerance and the load tolerance. This makes it possible to transmit the vehicle operation change information based on the speed tolerance and the load tolerance of the vehicles V1, V2, V3 . . . .

The conversion unit 108 may perform conversion processing so as not to exceed a preset upper limit for the load or the speed for each road surface on which the vehicles V1, V2, V3 . . . travel. This enables conversion based on the road surfaces on which the vehicles V1, V2, V3 . . . travel.

In addition, the conversion unit 108 may perform conversion processing so as not to exceed a preset upper limit for the load or the speed for each type of the vehicles V1, V2, V3 . . . . This enables conversion based on the type of the vehicles V1, V2 and V3 . . . .

When the determination unit 106 determines that the temperature tolerance is out of the tolerance range, the information generation unit 202 may generate deterioration suppression information capable of suppressing the progress of deterioration of the tires 10 (10a, 10b . . . ) of the vehicles V1, V2 and V3 . . . . This makes it possible to suppress the deterioration of the tires 10 (10a, 10b . . . ) of the vehicles V1, V2 and V3 . . . .

The vehicles V1, V2 and V3 . . . may be vehicles provided with an automatic driving device that drives automatically based on the vehicle operation change information or the like, or vehicles that are manually driven by a driver based on the vehicle operation change information or the like.

(Operation Example of Vehicle (Part 1))

An operation example of the vehicles (part 1) will be described with reference to FIG. 3.

In the operation example of the vehicle operation management system S1 illustrated in FIG. 3, the vehicles V1, V2, V3 . . . are loaded with mineral resources by the excavator 500 at the mining site 600, and transport such mineral resources to a destination 610 along the travel route 1 or the travel route 2.

Here, it is assumed that the travel route 1 is a route with which there is a relatively large load on the tires 10 (10a, 10*b* . . . ) (for example, poor road conditions, a high slope, rough undulation, etc.), and that has a relatively short distance and can improve productivity.

In contrast, it is assumed that the travel route 2 is a route with which there is a relatively small load on the tires 10 (10*a*, 10*b* . . . ) (for example, good road conditions, a low slope, less undulation, etc.), and that has a relatively long distance and results in low productivity.

When the determination unit 106 determines as the determination result that the temperature tolerance is within a tolerance range, the vehicle operation center 300 transmits the vehicle operation change information D1 to the vehicles V1, V2, V3 . . . .

In this case, the vehicle operation change information D1 includes information for improving the productivity of the vehicle V1 or the like. More specifically, the vehicle operation change information D1 may include control information and instruction information to cause the vehicle V1 or the like to travel by selecting the more productive route from the travel routes 1 and 2.

This makes it possible, for example, for the vehicle V1 to travel by selecting the travel route 1 with relatively high productivity based on the vehicle operation change information D1. Note that when the vehicle V1 is provided with an automatic driving device, the vehicle automatically travels on the travel route 1 based on the vehicle operation change information D1, and when the vehicle V1 is manually driven, the driver drives the vehicle V1 to travel on the travel route 1 according to the instructions (for example, a message such as "please travel on the travel route 1") based on the vehicle operation change information D1.

In contrast, when the determination unit 106 determines as the determination result that the temperature tolerance is out of a tolerance range, the vehicle operation center 300 transmits the vehicle operation change information D2 to the vehicles V1, V2, V3 . . . .

In this case, the vehicle operation change information D2 includes the deterioration suppression information capable of suppressing the progress of deterioration of the tires 10 (10*a*, 10*b* . . . ). More specifically, the vehicle operation change information D2 may include control information and instruction information to cause the vehicle V1 or the like to travel by selecting the route which is less burdensome to the tires from the travel routes 1 and 2.

This makes it possible, for example, for the vehicle V1 to travel by selecting the travel route 2 which is less burdensome to the tires based on the vehicle operation change information D2. Note that when the vehicle V1 is provided with an automatic driving device, the vehicle automatically travels on the travel route 2 based on the vehicle operation change information D2. In addition, when the vehicle V1 is manually driven, the driver drives the vehicle V1 to travel on the travel route 1 according to the instructions based on the vehicle operation change information D2.

The same processing is also applied to the other vehicles V2, V3 . . . .

In this way, the application of the vehicle operation management system S1 makes it possible to improve productivity by reducing failures of the tires 10 (10*a*, 10*b* . . . ) or the like, and to reduce the operation cost by making full use of the durability of the tires 10 (10*a*, 10*b* . . . ).

In the above example, for the sake of simplicity of explanation, a description has been given regarding the case in which two travel routes 1 and 2 are used; however, the present invention is not limited to this configuration, and may be applied to the case in which three or more travel routes are used.

(Operation Example of Vehicle (Part 2))

An operation example of the vehicles (part 2) will be described with reference to FIG. 4.

Figure 4:
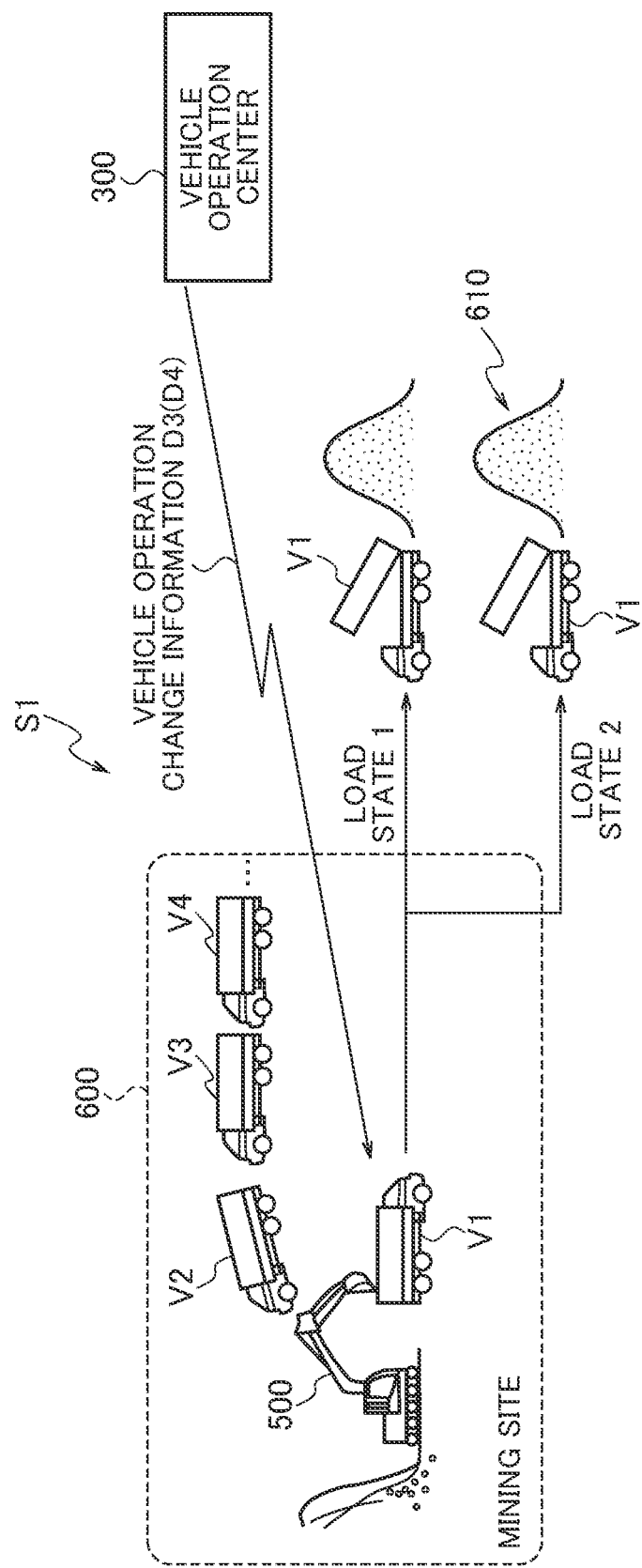
FIG. 4 is an explanatory diagram illustrating an operation example of vehicles (part 2).

In the operation example of the vehicle operation management system S1 illustrated in FIG. 4, the vehicles V1, V2, V3 . . . are loaded with mineral resources by the excavator 500 at the mining site 600, and transport such mineral resources to the destination 610 in a load state 1 or in a load state 2. It is assumed that the vehicles V1, V2, V3 . . . travel on the same travel route.

Here, it is assumed that the load state 1 is a state in which the load capacity is relatively large and the load on the tires 10 (10*a*, 10*b* . . . ) is relatively large, and productivity can be improved.

In contrast, it is assumed that the load state 2 is a state in which the load capacity is relatively small and the load on the tires 10 (10*a*, 10*b* . . . ) is relatively large, and productivity is low.

When the determination unit 106 determines as the determination result that the temperature tolerance is within a tolerance range, the vehicle operation center 300 transmits the vehicle operation change information D3 to the vehicles V1, V2, V3 . . . .

In this case, the vehicle operation change information D3 includes information for improving the productivity of the vehicle V1 or the like. More specifically, the vehicle operation change information D3 may include control information and instruction information to cause the vehicle V1 or the like to travel by selecting a more productive state from the load states 1 and 2.

This makes it possible, for example, for the vehicle V1 to travel by selecting the load state 1 with relatively high productivity based on the vehicle operation change information D3. Note that when the excavator 500 is automatically operated, the load capacity on the vehicle V1 can be automatically adjusted to increase such that the vehicle is in the load state 1, based on the vehicle operation change information D3. In addition, when the excavator 500 is manually operated, for example, a message such as "increase the load capacity so as to be in the load state 1" can be presented to the operator based on the vehicle operation change information D3.

In contrast, when the determination unit 106 determines as the determination result that the temperature tolerance is out of a tolerance range, the vehicle operation center 300 transmits the vehicle operation change information D4 to the vehicles V1, V2, V3 . . . .

In this case, the vehicle operation change information D4 includes the deterioration suppression information capable of suppressing the progress of deterioration of the tires 10 (10*a*, 10*b* . . . ). More specifically, the vehicle operation change information D4 may include control information and instruction information to cause the vehicle V1 or the like to travel by selecting a state which is less burdensome to the tires from the load states 1 and 2.

This makes it possible, for example, for the vehicle V1 to travel by selecting the load state 2 which is capable of suppressing the progress of deterioration of the tires 10 (10*a*, 10*b* . . . ) based on the vehicle operation change information D4. Note that when the excavator 500 is automatically operated, the load capacity on the vehicle V1 can be automatically adjusted to decrease such that the vehicle is in the load state 2, based on the vehicle operation change information D4. In addition, when the excavator 500 is manually operated, for example, a message such as "decrease the load capacity so as to be in the load state 2" can be presented to the operator based on the vehicle operation change information D4.

The same processing is also applied to the other vehicles V2, V3 . . . .

In this way, the application of the vehicle operation management system S1 makes it possible to improve productivity by reducing failures of the tires 10 (10a, 10b . . . ) or the like, and to reduce the operation cost by making full use of the durability of the tires 10 (10a, 10b . . . ).

In the above example, for the sake of simplicity of explanation, a description has been given regarding the case in which two load states 1 and 2 are applied; however, the present invention is not limited to this configuration, and three or more load states may be applied.

(Vehicle Operation Management Processing)

Figure 5:
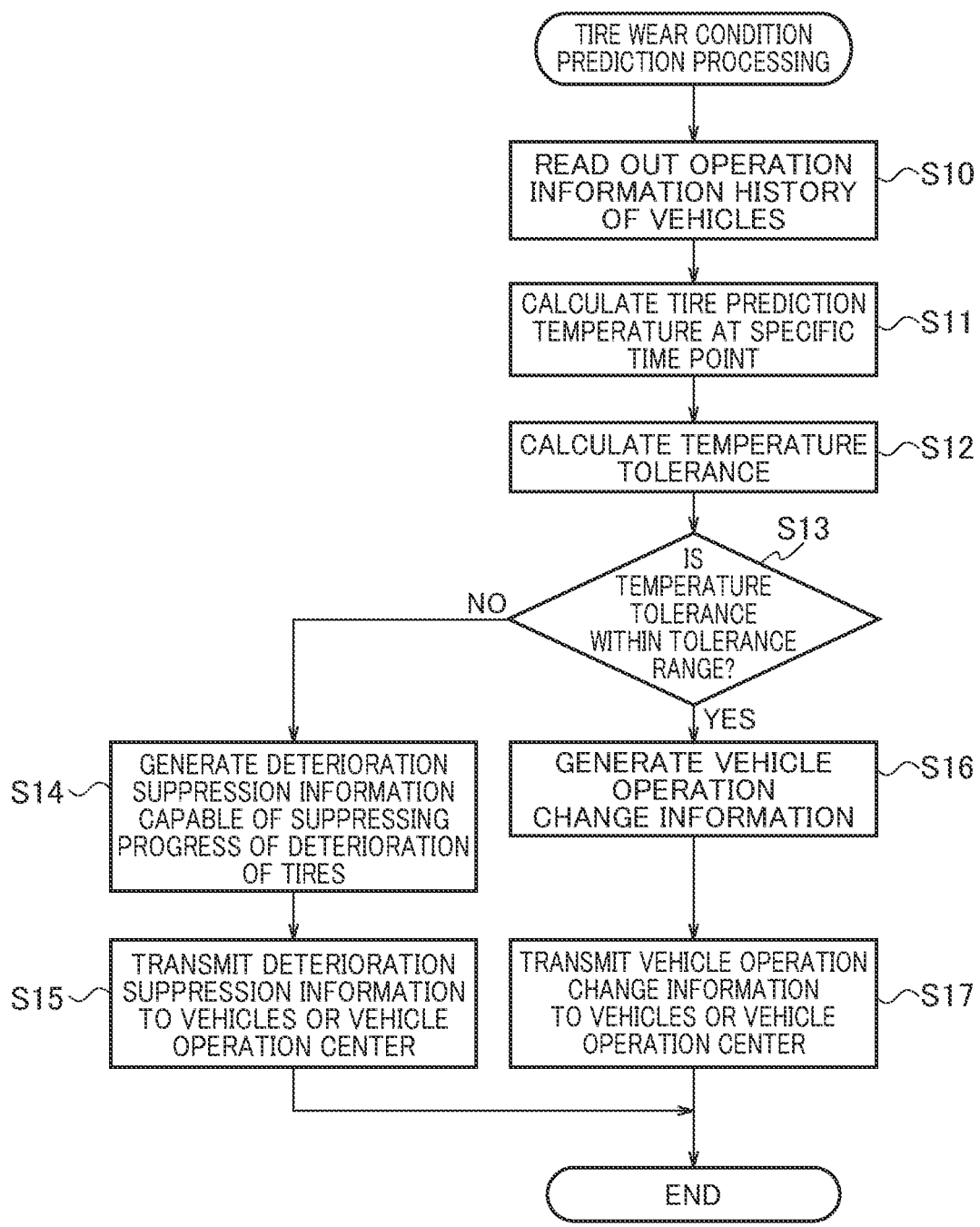
FIG. 5 is a flow chart illustrating an example of a processing procedure of vehicle operation management processing executed by the vehicle operation management system according to the embodiment.

The processing procedure of the vehicle operation management processing executed by the vehicle operation management system S1 will be described with reference to the flowchart of FIG. 5.

When the processing starts, the operation information history of the vehicles V1, V2, V3 . . . is first read out in step S10, and the processing moves to step S11.

In step S11, a predicted tire temperature at a specific time point is calculated and the processing moves to step S12.

Next, in step S12, a temperature tolerance is calculated and the processing moves to step S13.

In step S13, it is determined whether the temperature tolerance is within a tolerance range.

When the determination result is "No", the processing moves to step S14, and the deterioration suppression information which is capable of suppressing the progress of deterioration of the tires 10 (10a, 10b . . . ) is generated, and the processing moves to step S15.

In step S15, the deterioration suppression information is transmitted to the vehicles V1, V2, V3 . . . or to the vehicle operation center 300, and the processing ends.

When the determination result is "Yes", the processing moves to step S16, and the vehicle operation change information is generated, and the processing moves to step S17.

In step S17, the vehicle operation change information is transmitted to the vehicles V1, V2, V3 . . . or to the vehicle operation center 300, and the processing ends.

The vehicle operation management processing described above makes it possible to improve productivity by reducing failures of the tires 10 (10a, 10b . . . ) or the like, and to reduce the operation cost by making full use of the durability of the tires 10 (10a, 10b . . . ).

As the above operation information, the information such as tire internal temperature sensors, TPMS (tire pressure monitoring system), load, internal pressure, vehicle speed, wearing state, outside temperature, weather and vehicle type may be used.

In addition, the position of the predicted tire temperature is preferably at the belt end or the like where the effect on failure is relatively large.

The vehicle operation change information includes the information on tire load, a change in load capacity, a change in vehicle speed, a change of route where the vehicle travels, a change of allocation timing of the vehicle (stopping time, intervals, etc.), a change of tire internal pressure, or the like.

The deterioration suppression information includes the information on the instructions such as changing a travel route for the vehicle, leaving from a travel route, and decelerating the vehicle.

In terms of operation, it is preferable that the "specific time point" described above be unified for each of the vehicles V1, V2, V3 . . . .

In addition, a specific time point for a temperature prediction may be set to every 1 to 2 hours, for example.

In addition, regarding the temperature prediction, the techniques disclosed in JP Unexamined Patent Application Publication Nos. 2007-210527, 2007-210528, 2018-86892 or the like may be applied.

(Specific Examples of Vehicle Operation Change Information)

The specific examples of the vehicle operation change information include:

A) Adjustment of Load

The dispatcher instructs the excavator 500 to load soil or the like such that the payload is adjusted so as to be optimized for a temperature tolerance of the respective vehicles V1, V2, V3 . . . (temperature margin).

The load data may be measured at the excavator 500 side.

When the excavator 500 is automatically operated, the amount of s soil or the like to be loaded can be adjusted optimally according to the temperature tolerance of the respective vehicles V1, V2, V3 . . . (temperature margin).

B) Change of Intervals and Stopping Time

For example, it is possible to make predictions regarding the future how much the temperature of the tires will drop after the vehicle has stopped for how many minutes. For this reason, the minimum required stopping time is calculated, and the vehicle is instructed or controlled in such a way as to leave from the travel route or to stop during the calculated time.

In the case where the vehicles V1, V2, V3 . . . are automatically operated, even when stopping or decelerating on the travel route is performed, the intervals and the stopping can be achieved without causing unnecessary congestion by allowing the following vehicle to pass.

C) Change of Travel Route

The severity of each travel route can be evaluated (determining travel distance, congestion situation (based on travel speed, travel time, etc.), road wetness, etc.), and thus the travel route (travel route) can be specified by the temperature tolerance of the respective vehicles V1, V2, V3 . . . (temperature margin) (see example in FIG. 3).

For example, there is a long route and a short route in a mine, and thus it is possible to give instructions or take a control so as to take an appropriate route.

This makes it possible to eliminate the need for instructions to take a short route more than necessary and also reduce the congestion. This also makes it possible to improve productivity in a mine.

When the respective vehicles V1, V2, V3 . . . or the like are automatically driven, the travel speed can be expected for each route or depending on the congestion situation. For this reason, it is possible to make an allocation plan of the vehicles not only using the distance based on a long route or a short route, but also using the travel speed which is critical (strict) to the tire temperatures.

In addition, the congestion situation of each travel route can be grasped by monitoring, and thus it is possible to give instructions or take a control so as to decrease the vehicle speed by allowing an allocation of the vehicles on the congested travel route.

In addition, a plurality of loading and dumping points may be prepared, and thus it is possible to prepare several options for the route connecting the respective points (for example, three routes or more than that depending on the situation, such as a long route or a short route).

For example, a severity rank may be determined for each route, and thus it is possible to suggest an optimum route by a combination of the expected reaching temperature based on the amount of soil or the like to be carried and the severity rank of the routes.

The loading point is a place where soil or the like is loaded onto a dump truck with a shovel. The dumping point is a place where soil or the like carried by the dump truck is unloaded. In addition, the severity rank may be, for example, ranked by an average speed of the route for each shift or an average speed for each cycle, or ranked by a ratio of an actual average speed to a possible travelling speed at which the vehicles can travel with respect to an average slope of the routes.

D) Other

In mines, for example, a water truck sprinkles water to reduce dust buildup. For this reason, when the vehicle with the high tire temperature has been detected, the present system may be instructed or controlled in such a way as to wet the road surface by dispatching such a water truck, thereby reducing the tire temperature.

As described above, the vehicle operation management system S1 according to the present embodiment makes it possible to improve productivity by reducing failures of the tires or the like, and reducing the operation cost by making full use of the durability of the tires.

The vehicle operation management system, vehicle operation management program and vehicle operation management method of the present invention have been described based on the illustrated embodiment; however, the present invention is not limited to the illustrated embodiment, and the configuration of each component may possibly be replaced by any other configurations having equivalent functions.

For example, in the above embodiment, a description has been given regarding the case in which each component of the vehicle operation management system S1 is provided in the on-board device 150, but the present invention is not limited to this configuration. That is, for example, at least part of the vehicle operation management system S1 may be configured of a cloud computing system or the like, and the information such as the determination result may be transmitted to V1, V2, V3 . . . or the like.

EXPLANATION OF THE REFERENCE NUMERALS

S1 Vehicle operation management system
SN1 Sensor module
V1, V2, V3 . . . Vehicle
(10a, 10b . . . ) Tire
101 Operation information storage unit
102 Tire temperature prediction unit
103 Temperature threshold storage unit
104 Temperature tolerance calculation unit
105 Tolerance range storage unit
106 Determination unit
107 Communications unit
108 Conversion Unit
150 On-board device
200 Tire information management center
300 External system (Vehicle operation center)

The invention claimed is:

1. A vehicle operation management system comprising:
at least one autonomous driving vehicle;
at least one processor configured to
calculate a predicted tire temperature at a specific time point based on a history of operation information of the at least one autonomous driving a-vehicle mounted with tires;
calculate a temperature tolerance at the specific time point by comparing a preset temperature threshold with the predicted tire temperature;
determine whether or not the temperature tolerance is within a preset tolerance range; and
generate vehicle operation change information which changes operation of the vehicle when the determination unit determines that the temperature tolerance is within the tolerance range; and
a communication unit configured to transmit, via a wireless line, the generated vehicle operation change information to the at least one autonomous driving vehicle or to an external system which manages the operation of the at least one autonomous driving vehicle, wherein
a predicted tire temperature is calculated after a predetermined time has elapsed from a time point at which a prediction is made based on future operation information or virtual operation information about the at least one autonomous driving vehicle,
the temperature tolerance is calculated after the predetermined time has elapsed, and
the at least one autonomous driving vehicle is automatically driven based on the generated and transmitted vehicle operation change information.

2. The vehicle operation management system according to claim 1, wherein
the vehicle operation change information includes information for improving productivity of the vehicle.

3. The vehicle operation management system according to claim 2, wherein processors of the at least one processor that are configured to calculate the predicted tire temperature and to calculate the temperature tolerance are provided in each of a plurality of vehicles,
a temperature tolerance is calculated for each tire of the respective vehicles, and
the vehicle operation change information based on a determination result about a temperature tolerance of the tires of the respective vehicles is generated.

4. The vehicle operation management system according to claim 2, wherein the at least one processor is further configured to:
convert a temperature tolerance to at least one of a speed tolerance and a load tolerance of a vehicle, wherein
the vehicle operation change information related to the speed tolerance and the load tolerance is generated.

5. The vehicle operation management system according to claim 1, wherein
processors of the at least one processor that are configured to calculate the predicted tire temperature and to calculate the temperature tolerance are provided in each of a plurality of vehicles,
a temperature tolerance is calculated for each tire of the respective vehicles, and
the vehicle operation change information is generated based on a determination result about a temperature tolerance of the tires of the respective vehicles.

6. The vehicle operation management system according to claim 5, wherein the at least one processor is further configured to:
convert a temperature tolerance to at least one of a speed tolerance and a load tolerance of a vehicle, wherein
the vehicle operation change information related to the speed tolerance and the load tolerance is generated.

7. The vehicle operation management system according to claim 1, wherein the at least one processor is further configured to:
 convert a temperature tolerance to at least one of a speed tolerance and a load tolerance of a vehicle, wherein the vehicle operation change information related to the speed tolerance and the load tolerance is generated.

8. The vehicle operation management system according to claim 7, wherein the at least one processor is further configured to:
 perform conversion processing so as not to exceed a preset upper limit for load or speed for each road surface on which the vehicle travels.

9. The vehicle operation management system according to claim 7, wherein the at least one processor is further configured to:
 perform conversion processing so as not to exceed a preset upper limit for load or speed for each type of the vehicle.

10. The vehicle operation management system according to claim 1, wherein the at least one processor is further configured to:
 determine that the temperature tolerance is out of a tolerance range, and generate deterioration suppression information capable of suppressing progress of deterioration of the tires of the vehicle.

11. A non-transitory computer readable medium storing a vehicle operation management program executed by a vehicle operation management system, the program comprising:
 a tire temperature prediction step of calculating a predicted tire temperature at a specific time point based on a history of operation information of at least one autonomous driving vehicle mounted with tires;
 a temperature tolerance calculation step of calculating a temperature tolerance at the specific time point by comparing a preset temperature threshold with the predicted tire temperature;
 a determination step of determining whether or not the temperature tolerance is within a preset tolerance range;
 an information generation step of generating vehicle operation change information which changes operation of the at least one autonomous driving vehicle when determining that the temperature tolerance is within the tolerance range; and
 a transmission step of transmitting the generated vehicle operation change information to the vehicle or to an external system which manages the operation of the at least one autonomous driving vehicle;
 a predicted tire temperature is calculated after a predetermined time has elapsed from a time point at which a prediction is made based on future operation information or virtual operation information about the at least one autonomous driving vehicle, and
 the temperature tolerance is calculated after the predetermined time has elapsed;
 wherein the at least one autonomous driving vehicle is automatically driven based on the generated and transmitted vehicle operation change information.

12. A vehicle operation management method comprising:
 a tire temperature prediction process of calculating a predicted tire temperature at a specific time point based on a history of operation information of a at least one autonomous driving vehicle mounted with tires;
 a temperature tolerance calculation process of calculating a temperature tolerance at the specific time point by comparing a preset temperature threshold with the predicted tire temperature;
 a determination process of determining whether or not the temperature tolerance is within a preset tolerance range;
 an information generation process of generating vehicle operation change information which changes operation of the at least one autonomous driving vehicle when determining that the temperature tolerance is within the tolerance range; and
 a transmission process of transmitting the generated vehicle operation change information to the vehicle or to an external system which manages the operation of the at least one autonomous driving vehicle, wherein
 the tire temperature prediction process includes calculating a predicted tire temperature after a predetermined time has elapsed from a time point at which a prediction is made based on future operation information or virtual operation information about the at least one autonomous driving vehicle, and
 the temperature tolerance calculation process includes calculating a temperature tolerance after the predetermined time has elapsed;
 wherein the at least one autonomous driving vehicle is automatically driven based on the generated and transmitted vehicle operation change information.

* * * * *